(12) United States Patent
Thomson et al.

(10) Patent No.: US 6,991,091 B2
(45) Date of Patent: Jan. 31, 2006

(54) FLAT STROKE BI-DIRECTIONAL CONVEYOR

(75) Inventors: Thomas M. Thomson, Crystal Lake, IL (US); Ronald M. Jacobson, Crystal Lake, IL (US)

(73) Assignee: Vibra-Dyn, LLC, Crystal Lake, IL (US)

( * ) Notice: Subject to any disclaimer, the term of this patent is extended or adjusted under 35 U.S.C. 154(b) by 64 days.

(21) Appl. No.: 10/431,220

(22) Filed: May 7, 2003

(65) Prior Publication Data

US 2004/0222069 A1 Nov. 11, 2004

(51) Int. Cl.
  B65G 27/00 (2006.01)
  B65G 27/32 (2006.01)
  B65G 27/02 (2006.01)

(52) U.S. Cl. ............ 198/752.1; 198/753; 198/759

(58) Field of Classification Search ........... 198/752.1, 198/753, 759, 770
See application file for complete search history.

(56) References Cited

U.S. PATENT DOCUMENTS

| | | | |
|---|---|---|---|
| 5,064,053 A | * 11/1991 | Baker | 198/753 |
| 5,762,176 A | * 6/1998 | Patterson et al. | 198/770 |
| 5,934,446 A | 8/1999 | Thomson | |
| 5,938,001 A | * 8/1999 | Turcheck et al. | 198/770 |
| 5,979,640 A | 11/1999 | Horton et al. | |
| 6,079,548 A | 6/2000 | Svejkovsky et al. | |
| 6,145,652 A | 11/2000 | Durnil | |
| 6,155,404 A | * 12/2000 | Musschoot | 198/753 |
| 6,269,940 B1 | 8/2001 | Rosenstrom | |
| 6,276,518 B1 | 8/2001 | Wierman | |
| 6,298,978 B1 | 10/2001 | Rosenstrom | |
| 6,398,031 B1 | 6/2002 | Frezza | |
| 6,415,911 B1 | 7/2002 | Svejkovksy et al. | |
| 6,601,695 B1 | * 8/2003 | Rosenstrom | 198/770 |

* cited by examiner

*Primary Examiner*—Gene O. Crawford
(74) *Attorney, Agent, or Firm*—Cook, Alex, McFarron, Manzo, Cummings & Mehler, Ltd.

(57) ABSTRACT

A flat stroke bi-directional conveyor for conveying object, granular and powder material. The unit utilizes the skewed sine wave trough stroke principle using primary eccentric counterweights wheels driven by a motor running at the secondary speed and equipped with the secondary eccentric counterweight wheels. The forces not in line with the trough stroke are absorbed with an isolation spring mounted between the drive assembly and the base.

9 Claims, 4 Drawing Sheets

FLAT STROKE BI-DIRECTIONAL CONVEYOR

FIELD OF THE INVENTION

The present invention relates to vibrating conveyors, and more particularly, to a vibratory conveyor of the flat stroke design, capable of conveying in both the forward and reverse flow direction.

BACKGROUND OF THE INVENTION

Two-way flat stroke vibratory conveyors or feeders have substantial applications in a variety of fields. One typical application is in foundry operations wherein, for example, foundry castings may be delivered to a conveyor energized to feed the castings to one end or the other, depending upon where it is desired to locate the castings. Another typical application is in the bulk operations of granular materials wherein, for example, sugar, sand, stone, flour, cement, and various other chemical compounds may be delivered to one end or the other in the same way. Additionally, the conveyors may also move combinations of these object, granular and powder materials.

A conventional two-way flat stroke conveyor made according to the prior-art will typically include a motor powered drive system that includes four drive shafts having pairs of eccentric counterweight wheels connected via an elaborate belt connection. This drive is coupled to an elongated bed with an upwardly facing, generally horizontal conveying or feeding surface terminating at opposite ends. In operation the two sets of eccentric counterweight wheels are driven such that the wheels in each set rotate in opposite direction and the two sets are 90° out of phase relative to one another. When the motor powers the drives, a cyclic vibratory force is produced and the output displacement is transferred to the bed to create material flow. If one were to plot the sum of the stroke versus stroke angle of the sets of eccentric counterweight wheels, the result would be a skewed or biased sine wave in the direction of material flow. By reversing the rotation of the system, the skewed sine wave is reversed and the material flow is reversed.

This prior art conveyor poses a number of problems, the greatest of which is the complexity of the drive on what is essentially a brute force system. In other words, as the drive consists of four shafts with pairs of eccentric counterweight wheels, and the wheels, bearings and shafts must be large to transfer the forces, the result is a complex belt drive system with great maintenance and alignment difficulties.

U.S. Pat. No. 5,934,446 to Thomson (incorporated herein by reference) attempts to address these problems with a vibratory conveyor that includes a generally horizontal, elongated conveying surface connected to a base by generally vertically arranged, resilient slats. A drive is mounted to the surface and includes two rotary eccentric shafts coupled in series and set 90° out of phase for vibrating the surface in a generally horizontal direction by imparting a cyclic vibrating force in the form of a skewed sine wave. In other words, the drive, through the connecting drive slats, imparts a horizontal force to the trough, causing it to vibrate in the horizontal direction.

Essentially, the conveyor in the Thomson patent is tuned, through the reactor slats, to approximately 7% above the primary shaft rpm. This design, as such, takes advantage of the sub-resonant natural frequency and reduces the forces to the drive bearings as well as reducing the motor size requirements as compared to the prior art. In other words, the primary horizontal eccentric force and stroke is amplified and the lessor secondary eccentric wheel force is transmitted in a brute force manner, resulting in a smaller skewing stroke component. However, the disadvantage of the Thomson patent remains its drive complexity and space limitation with respect to both manufacture and maintenance costs.

Accordingly, it is a general object of the present invention to provide a new and improved flat stroke bi-directional conveyor.

Another general object of the present invention is to overcome those deficiencies of the flat stroke conveyors of the prior art.

It is a more specific object of the present invention to provide an improved flat stroke bi-directional conveyor which utilizes the skewed sine wave principle to transfer force to the conveying bed.

It is another object of the present invention to provide an improved conveyor which utilizes less and smaller component parts, as compared to current practice, thereby greatly reducing manufacture and maintenance costs.

SUMMARY OF THE INVENTION

The invention is generally directed to a bi-directional vibratory conveyor having a trough with an upper conveying surface for transferring energy to convey material along the surface. The drive assembly includes a drive shaft with a primary counterweight and a driven sheave, a motor shaft with a secondary counterweight and a driver sheave, a timing belt connecting the sheaves and a motor having a reversible output connected to the motor shaft for causing a direction of rotation that produces both horizontal and vertical energy components.

BRIEF DESCRIPTION OF THE DRAWINGS

The features of the present invention which are believed to be novel, are set forth with particularity in the appended claims. The invention, together with the further objects and advantages thereof, may best be understood by reference to the following description taken in conjunction with the accompanying drawings, in the several figures of which like reference numerals identifying like elements, and in which:

DESCRIPTION OF THE PREFERRED EMBODIMENTS

Figure 1:
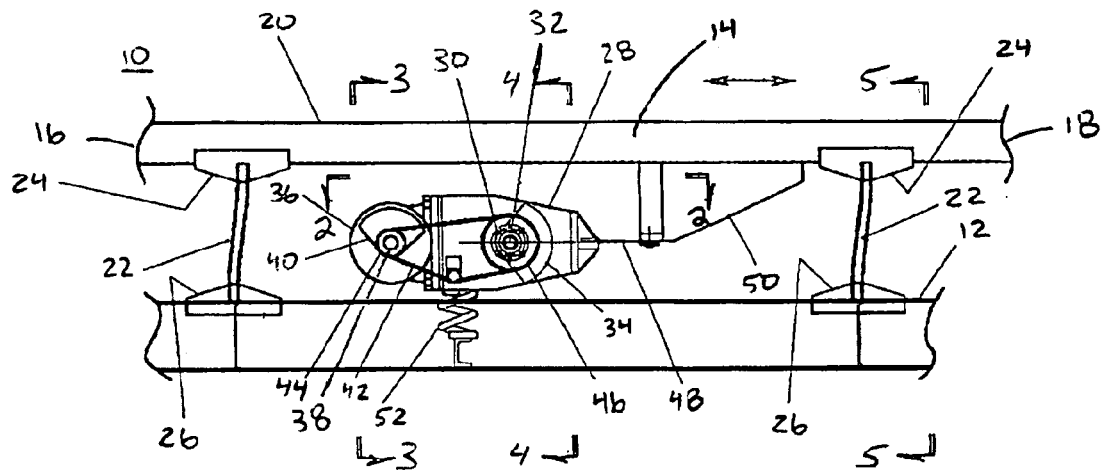
FIG. 1 is a side elevation view of a flat stroke bi-directional conveyor made according to the principles of the present invention with certain parts omitted for clarity purposes.

An exemplary embodiment of a flat stroke bi-directional conveyor or feeder is illustrated in the drawings and will be described herein as a conveyor, it is understood that the terms conveyor and feeder are synonymous for purposes of the present application. Referring now to the drawings, and particularly to FIG. 1, a conveyor 10 constructed in accordance with the invention is seen to basically include a base 12, which may be mounted on the underlying terrain as, for example, the floor of a building, a table structure or the like. Supported about the base 12 is a generally horizontal, elongated, trough 14 having opposed ends 16 and 18, as well as an upper conveying surface 20. The trough 14 is supported about the base 12 by a series of vertically arrayed, vertical resiliency members 22, for example a rocker leg and coil spring combination, or, preferably vertical leaf spring slats of conventional construction that are secured to both the underside of the trough 14 and to the base 12 at spaced locations via fabricated structural brackets 24 and fabricated brackets 26 respectively.

Figure 2:
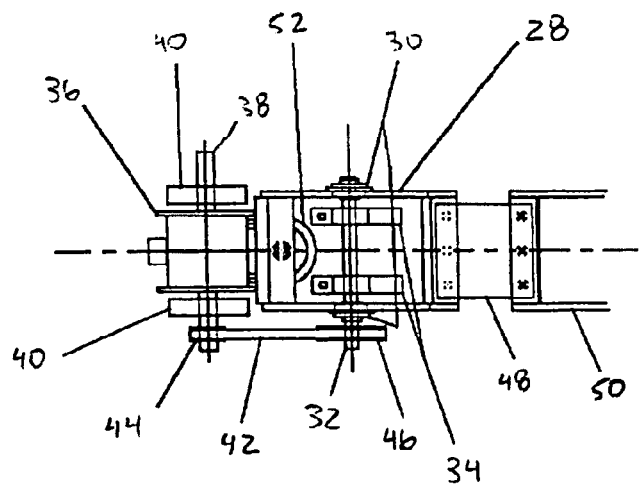
FIG. 2 is a cross-sectional top plan view of the bi-directional conveyor made according to the principles of the present invention taken along lines 2—2 of FIG. 1.

The drive assembly, FIG. 2, consists of a structural drive fabricated horizontal rectangular box 28 and is preferably opened at the top and bottom. Two flange bearings 30 are mounted on each longitudinal side holding a lateral drive shaft 32 which in turn supports two primary eccentric counterweights 34. A preferably totally enclosed and non-ventilated heavy duty reversible shaker motor 36 is bolted at one end of the drive box 28 so that the motor shaft 38 is lateral and horizontal to the elongated trough 14. Two secondary eccentric counterweights 40 are mounted on the motor shaft 38. The two primary eccentric counterweights 32 are driven by a synchronous timing belt 42 and driver and driven sprocket system are respectively longitudinally aligned whereby the driver sheave 44 is mounted on the motor shaft 38 and the driven sheave 46 is mounted on the primary drive shaft 32. The drive assembly is attached to the trough 14 with a horizontal resiliency member 48, preferably a leaf spring slat connected to the drive at the opposite end of the drive motor 36 and attached to a trough drive bracket 50 that is in turn connected to the trough 14. Lastly, a spring 52 is connected to the bottom side of the drive and at the opposite end to the base 12.

Figure 3:
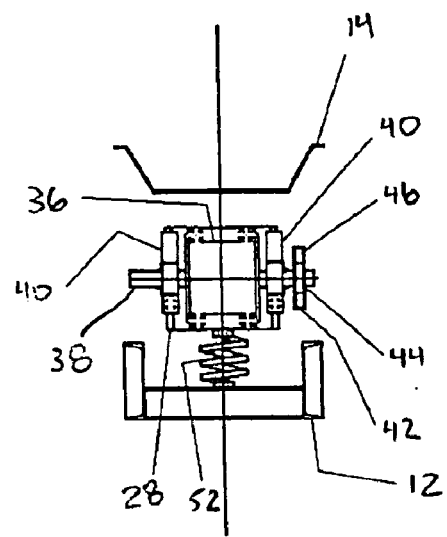
FIG. 3 is a cross-sectional frontal view of the bi-directional conveyor made according to the principles of the present invention taken along lines 3—3 of FIG. 1.

Thus far, FIGS. 1 and 2 have been shown and described to give the overall look and general structure of the principle components of the present invention. Turning now to the cross-sectional views of FIGS. 3–5, the functional aspects of the principle components of the present invention are shown and described. Referring to FIG. 3, the front of the drive assembly is shown with respect to its position above the base 12 and beneath the trough 14 as supported by the spring 52. Within the drive box 28 is the shaker motor 36 which drives motor shaft 38. The two secondary eccentric counterweights 40 rotate about the shaft 38 upon the motor 36 generating rotational power to the shaft 38. Also, coupled to and rotating with the motor shaft 38 is the driver sheave 44. The driver sheave 44 in turn rotates the driven sheave 46 through timing belt 42. In the preferred embodiment, the driven sheave 46 is preferably twice the diameter of the driver sheave 44, thereby causing the primary eccentric counterweights 34 to rotate at half the speed of the secondary eccentric counterweights 40. Although, multiple combinations may provide the desired results, these speeds of rotation are preferably 300 r.p.m. and 600 r.p.m. respectively.

Figure 4:
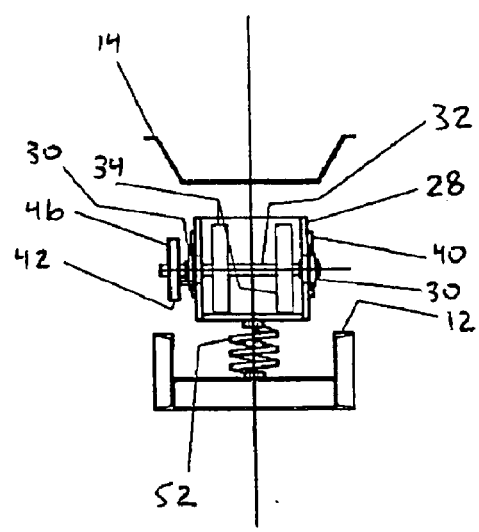
FIG. 4 is a cross-sectional rear view of the bi-directional conveyor made according to the principles of the present invention taken along lines 4—4 of FIG. 1.

Referring now to FIG. 4, the rear of the drive assembly is shown with respect to its positions above the base 12 and beneath the trough 14 as supported by the spring 52. The previously discussed rotation of the driven sheave 46 in turn rotates the lateral drive shaft 32, which is supported within the drive box 28 by flange bearings 30, thereby causing the two primary eccentric counterweights 34 to rotate about the drive shaft 32. The primary eccentric counterweights 34 and the secondary eccentric counterweights 40 are timed so that the primary eccentric counterweights 34 are horizontal when the secondary eccentric counterweights 40 are vertical i.e. lag the primary eccentric counterweights by 90°. The spring 52 illustrated in FIGS. 1–4 as being connected to the bottom side of the drive assembly and the opposite end connected to the base 12 serves a dual purpose. First, the spring 52 is sized to isolate and help support the drive assembly from the base 12 and accordingly nearly eliminates the vertically induced forces transmitted to the ground. In other words, the forces of the wheels not in line with the trough stroke (infra) are absorbed via this spring. Second, the spring 52 supports the drive assembly weight in order to relieve pre-loading the horizontal leaf spring slat 48.

Figure 5:
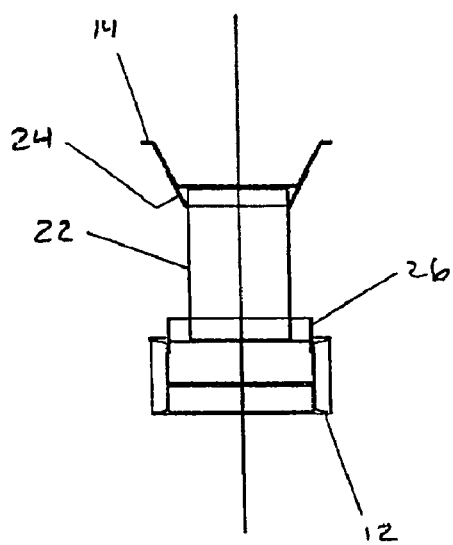
FIG. 5 is a cross-sectional rear view of the bi-directional conveyor made according to the principles of the present invention taken along lines 5—5 of FIG. 1.

Finally, FIG. 5 illustrates the coupling of the base 12 and the trough 14 through the leaf spring slats 22 that are connected thereto by fabricated structural brackets 24 and fabricated brackets 26 respectively. These leaf spring slats 22 are sized so that the total spring rate sets the single mass natural frequency of the elongated trough 14 mass at preferably about seven percent (7%) over the primary running frequency. Furthermore, the leaf spring slats 22 are positioned vertically with respect to the base 12 and trough 14 so that the direction of the vibratory motion is horizontal and parallel to the elongated trough 14.

Figure 6:
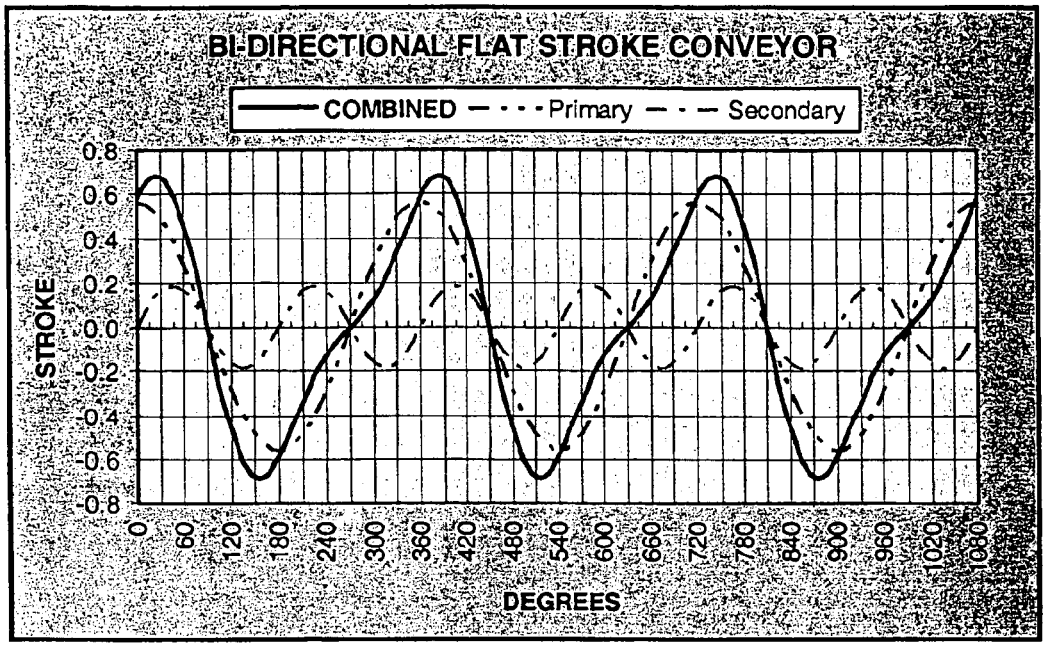
FIG. 6 is a graph plotting stroke versus stroke angle of the primary and secondary counterweights as well as the combined sum of the two frequencies showing the skewed sinusoidal stroke.

With the general structure and function of the component parts shown and described with respect to FIGS. 1-5, FIGS. 6–9 are now discussed as they relate to the general operation of the present invention. During operation and when the motor 36 is turned on to rotate the motor shaft 38 in a counter-clockwise manner, the secondary eccentric counterweights 40 and the primary eccentric counterweights 34 transfer energy through the horizontal leaf spring slat 48, the trough drive bracket 50, and ultimately the trough 14 in the form of a modified sinusoidal skewed stroke pattern as shown in FIG. 6. This stroke pattern has been termed a "skewed sine wave" in that the slope of one side of each wave is shallower than the slope of the other side of the wave. Thus, if the stroke pattern illustrated by FIG. 6 is being applied to the components in the manner illustrated in FIGS. 1–5, movement of the trough 14 to the right, that is toward the end 18, will be relatively slow while the return movement toward the other end 16 will be relatively fast. In this case, conveying will be to the right because the slow movement to the right will allow the material being conveyed to frictionally engage and be advanced in that direction by the conveying surface 20 of the trough 14. On the other hand, the fact that the return is so rapid, and the fact that the material still contains momentum energy from the rightward stroke will result in little or no reverse movement during the return stroke. The net result will be conveying of the material to the right.

Figure 7:
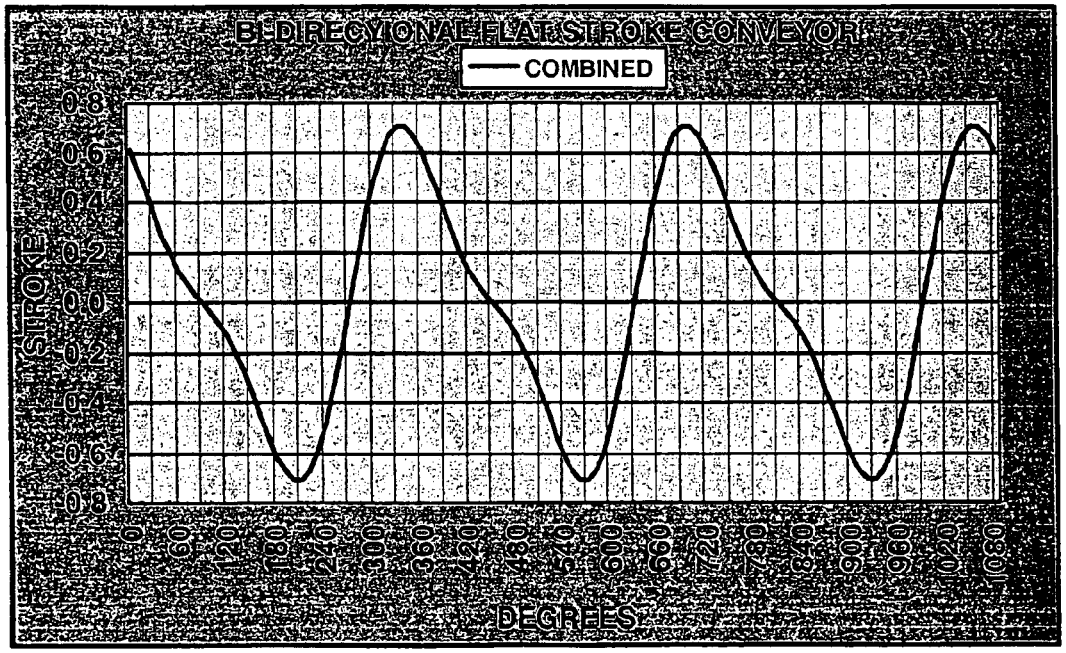
FIG. 7 is a graph of the combined sum of the two frequencies of FIG. 6 when the motor rotation is reversed.

When the operation is as in FIG. 7, the opposite will occur. By reversing the motor rotation, the sinusoidal skewed stroke is biased to the left and the material flow is reversed to the left. As above, but stated differently, the stroke is skewed, now to the left, so that the trough movement to the left takes approximately twice the time which results in a low enough acceleration force, to promote material conveyance during the portion of the cycle as the return movement to the right does. The result is a biased impulse to the left causing material on the trough to be conveyed to the left.

As shown and described, it is the transfer of energy of the counterweights to the trough that produces the material flow. The present invention provides this forward material flow because the eccentric counterweight wheels are aligned such that the secondary wheels lag the primary wheels by 90° when the primary wheels are in line with the line of action of the trough stroke. The 90° offset fixed eccentric counterweight wheels are further capable of producing reverse material flow because the offset run in the opposite direction changes from a lagging profile to a leading profile resulting in reversing the skewed sinusoidal stroke.

Figure 9:
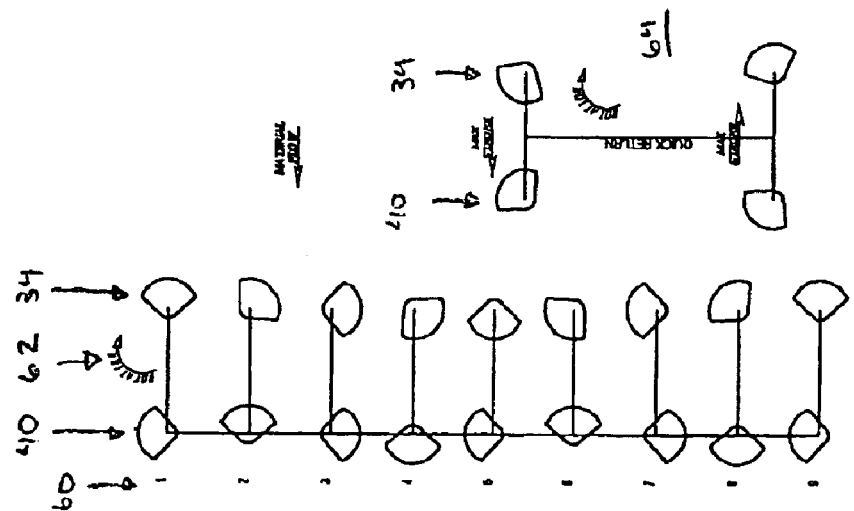
FIG. 9 is a depiction of the eccentric counterweight wheel positions every 90° of clockwise rotation of the secondary wheels.
Figure 8:
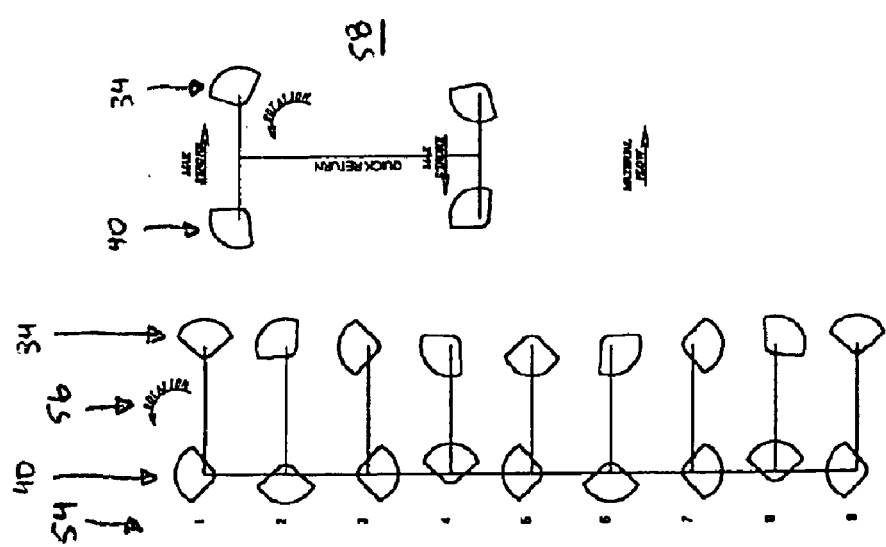
FIG. 8 is a depiction of the eccentric counterweight wheel positions every 90° of counter-clockwise rotation of the secondary wheels.

This lagging/leading 90° offset is best illustrated with respect to FIGS. 8 and 9 respectively. FIG. 8 shows a step-wise representation 54 of the relative positions of the primary 34 and secondary 40 eccentric counterweights for every 90° counter-clockwise rotation 56 of the secondary eccentric counterweights 40. The phase illustration 58 to the right of the nine-step series 54 shows the positions of the wheels where the maximum strokes occur when the material flow is from left to right. Similarly, FIG. 9 shows a step wise representation 60 of the relative positions of the primary 34 and secondary 40 eccentric counterweights for every 90° clockwise rotation 62 of the secondary eccentric counterweights 40. The phase illustration 64 to the right of the nine-step series 60 shows the positions of the wheels where the maximum strokes occur when the material flow is from right to left.

From the foregoing, it will be appreciated that a flat stroke bi-directional vibratory conveyor made according to the invention produces a number of advantages over the prior art apparatus. For one, wheel sizes are greatly reduced without loss of stroke force. More particularly, the present invention utilizes a 2:1 frequency ratio and a 1:3 eccentric force ratio that results in the wheel sizes to be [(2×2)×1]:[1×3] or a 4:3 ratio for wheel size. Furthermore, the size of the wheels are even smaller because the present invention's lower frequency stroke is amplified by the sub-resonant tuned frequency of the trough, thereby further reducing the 4:3 ratio to around 1.75:3 ratio. In other words, by adapting the motor to the secondary frequency, motor eccentric counterweight wheels are small, and further, the primary eccentric counterweight wheels are minimized because of the sub-resonant tuning of the conveyor.

By way of example, assume that the conveyor trough natural frequency is set to be around 7% above the primary frequency. So, if the primary frequency is 300 rpm then the trough frequency is set to 320 rpm. The combined result is that the primary running frequency of 300 rpm is amplified as a sub-resonant natural frequency single mass conveyor system. The primary and secondary counterweight wheels have approximately the same brute force stroke. Because the primary natural frequency is close to the primary running speed, the trough stroke amplifies by a factor of about three times the brute force stroke.

It will therefore be appreciated that a flat-stroke bi-directional conveyor made according to the principles of the present invention provides considerable advancements over the aforementioned deficiencies of the prior art.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true sprit and scope of the invention.

We claim:

1. A bi-directional vibratory conveyor, comprising:

a generally horizontal elongated conveying surface;

a drive shaft affixed for rotation about a first axis generally transverse to the direction of elongation of said conveying surface, said drive shaft having a primary counterweight and a driven sheave;

a motor shaft generally parallel to and spaced from said drive shaft and affixed for rotation about a second axis, said motor shaft having a secondary counterweight and a driver sheave;

said primary counterweight and said secondary counterweight being about 90° out of phase with one another;

a timing belt coupling said driver sheave and said driven sheave;

a motor having a reversible output connected to said motor shaft for causing one direction of rotation, said primary counterweight to lead said secondary counterweight by about 90° and for the opposite direction of rotation, said primary counterweight to lag said secondary counterweight by about 90° whereby said rotation produces a horizontal and vertical energy component;

said motor, said shafts and said timing belt comprise a drive supported on a base by a spring;

spring slats coupling said base to said conveying surface, said slats sized such that a total spring rate sets a single mass natural running frequency of said conveying surface greater than a primary running frequency; and a resiliency member coupling said energy components to said conveying surface.

2. A bi-directional vibratory conveyor as defined in claim 1 wherein said sheaves each having a diameter such that the diameter of said driven sheave is generally twice the diameter of said driver sheave.

3. A bi-directional vibratory conveyor as defined in claim 1 wherein said spring slats are sized such that a total spring rate sets a single mass natural running frequency of said conveying surface at about seven percent over a primary running frequency.

4. A bi-direction vibratory conveyor, comprising:

a trough having an upper conveying surface;

a drive assembly coupled to said trough, said drive assembly comprising:

a drive shaft having a primary counterweight and a driven sheave;

a motor shaft having a secondary counterweight and a driver sheave;

said primary counterweight and said secondary counterweight being about 90° out of phase with one another;

a timing belt coupling said sheaves;

a motor having a reversible output connected to said motor shaft for causing a direction of rotation and producing a horizontal and vertical energy component;

said motor, said shafts and said timing belt comprise a drive supported on a base by a spring;

spring slats coupling said base to said conveying surface, said slats sized such that a total spring rate sets a single mass natural running frequency of said conveying surface greater than a primary running frequency; and a resiliency member coupling said drive assembly to said trough whereby said horizontal energy component conveys material over said surface.

5. A bi-directional vibratory conveyor as defined in claim 4 wherein said sheaves each having a diameter such that the diameter of said driven sheave is generally twice the diameter of said driver sheave.

6. A bi-directional vibratory conveyor as defined in claim 4 wherein said spring slats are sized such that a total spring rate sets a single mass natural running frequency of said conveying surface at about seven percent over a primary running frequency.

7. A bi-directional vibratory conveyor, comprising:

means defining a generally horizontal elongated conveying surface;

a first shaft affixed for rotation about a first axis generally transverse to the direction of elongation of said conveying surface, said first shaft having a first counterweight and a first sheave;

a second shaft generally parallel to and spaced apart from said first shaft and affixed for rotation about a second axis, said second shaft having a second counterweight and a second sheave;

said first and second counterweights being about 90° out of phase with one another;

a means for coupling said sheaves;

a means for driving said second shaft and producing a horizontal and vertical energy component;

said means for driving, said shafts and said means for coupling said sheaves comprise a drive assembly supported on a base by a means for supporting;

spring slats coupling said base to said conveying surface, said slats sized such that a total spring rate sets a single mass natural running frequency of said conveying surface greater than a primary running frequency; and a means for transferring said energy component to said conveying surface.

8. A bi-directional vibratory conveyor as defined in claim 7 wherein said sheaves each having a diameter such that the diameter of said driven sheave is generally twice the diameter of said driver sheave.

9. A bi-directional vibratory conveyor as defined in claim 7 wherein said spring slats are sized such that a total spring rate sets a single mass natural running frequency of said conveying surface at about seven percent over a primary running frequency.

* * * * *